Sept. 17, 1935.　　　　P. E. FISCHER　　　　2,014,617
MEASURING AND FILLING DEVICE
Filed June 19, 1934　　　5 Sheets-Sheet 1
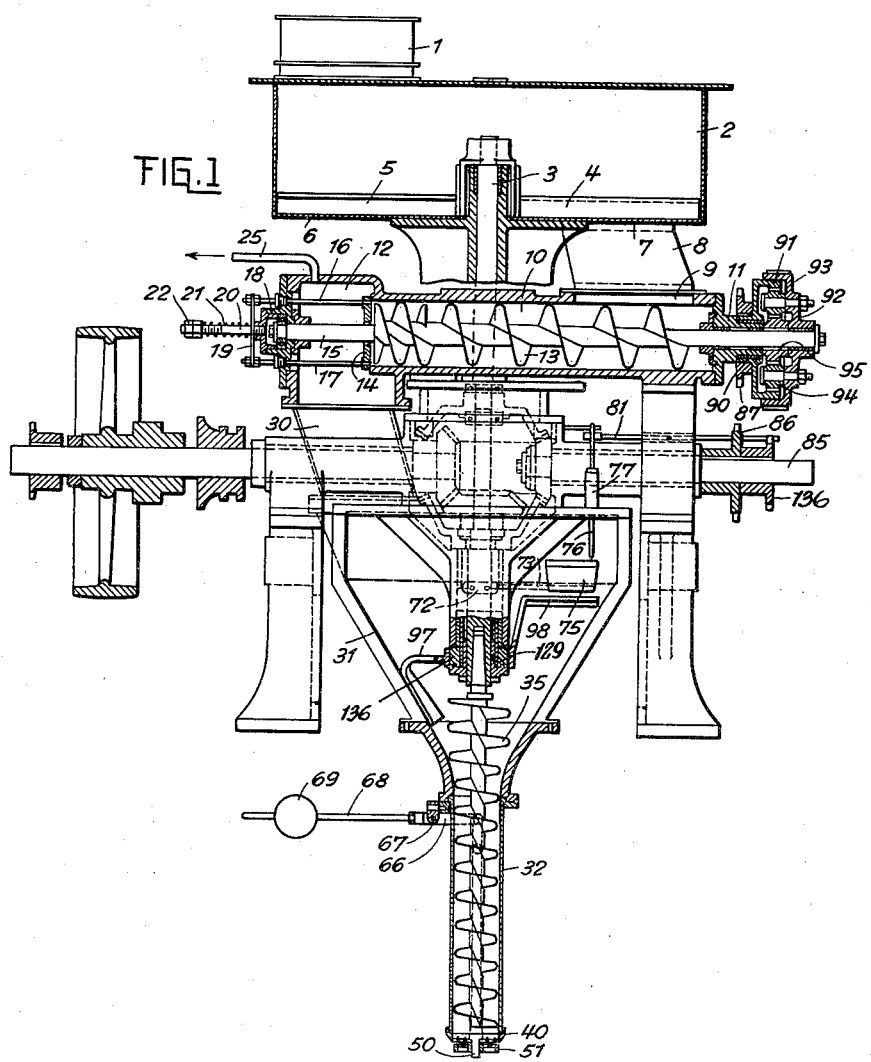
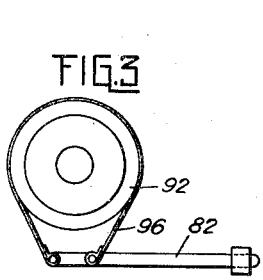
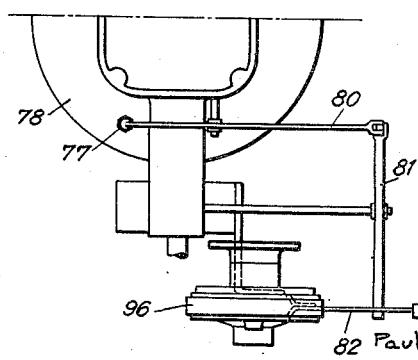
Paul Emil Fischer
INVENTOR
his ATT'Y.

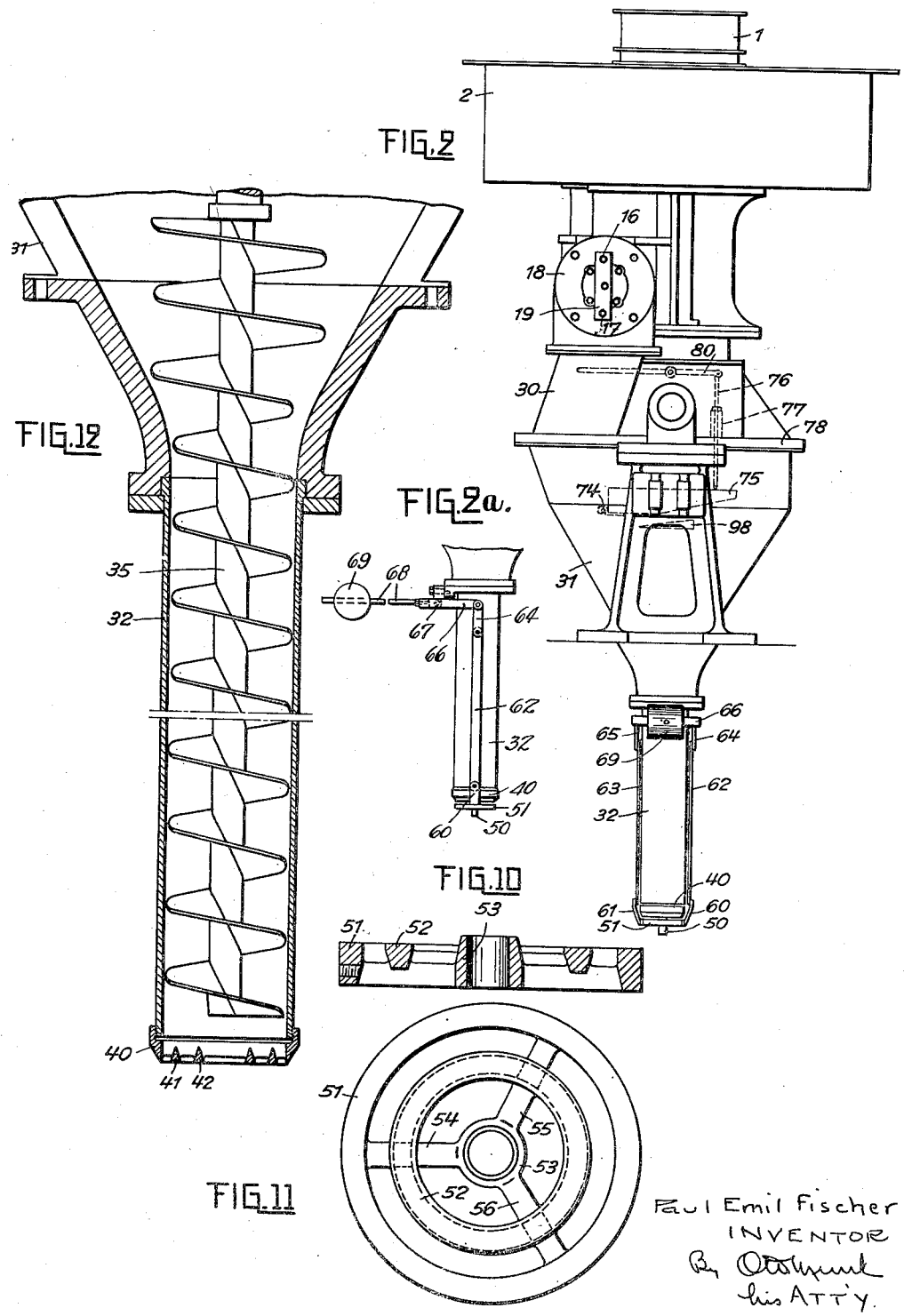

Sept. 17, 1935.                P. E. FISCHER                2,014,617
                         MEASURING AND FILLING DEVICE
                          Filed June 19, 1934        5 Sheets-Sheet 3
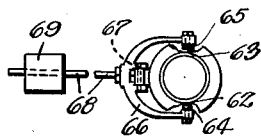
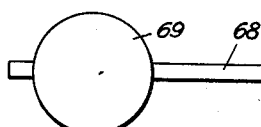
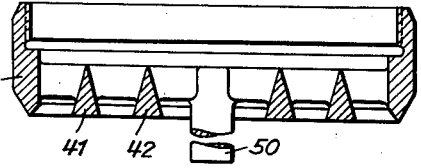
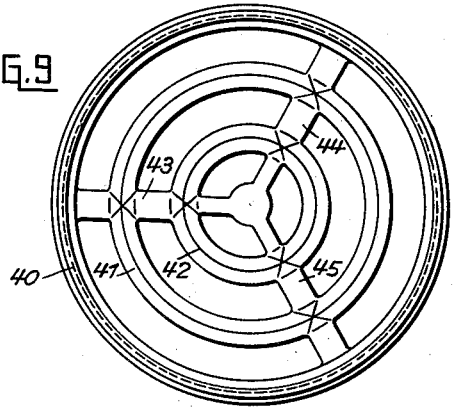
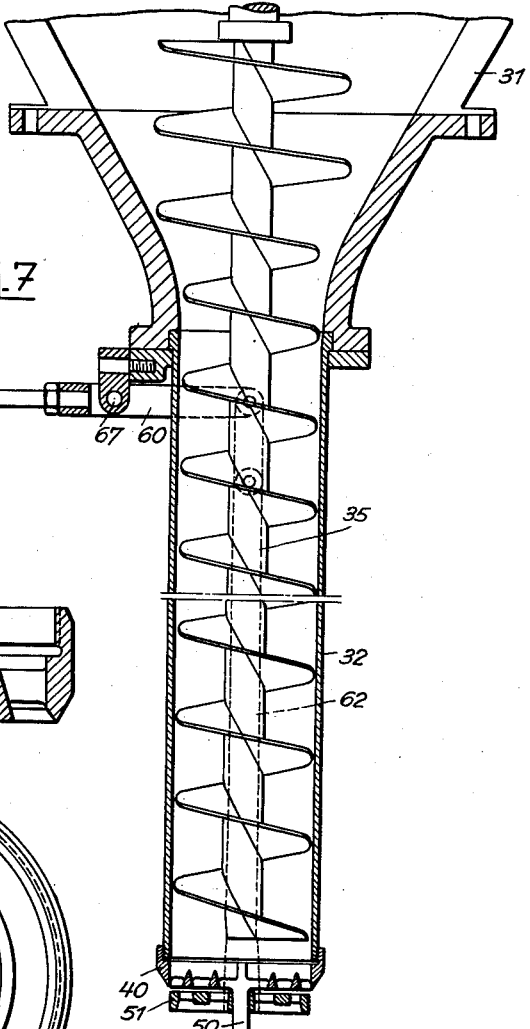
Paul Emil Fischer
     INVENTOR

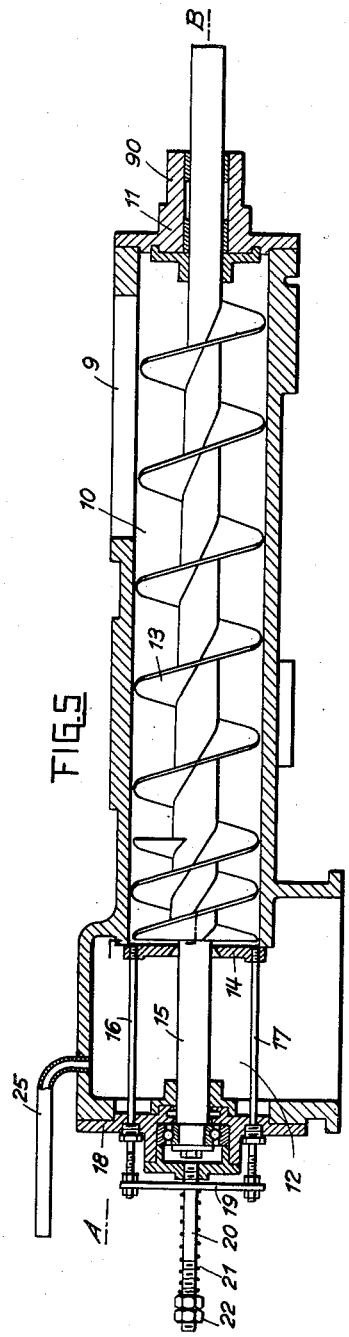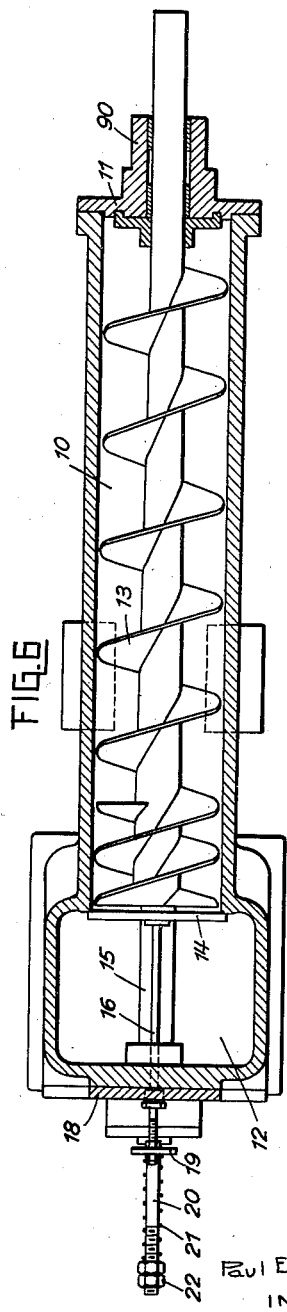

Sept. 17, 1935.  P. E. FISCHER  2,014,617
MEASURING AND FILLING DEVICE
Filed June 19, 1934   5 Sheets-Sheet 5
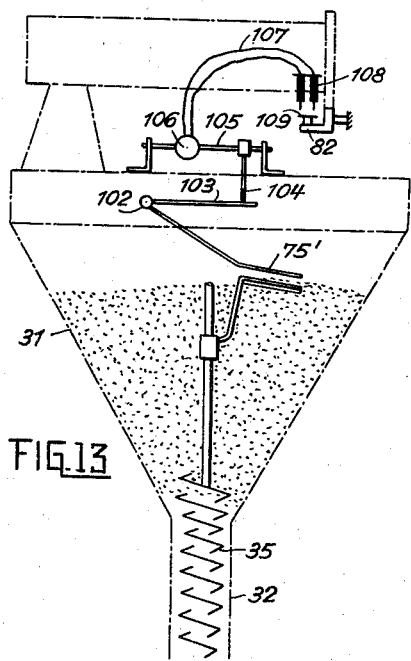
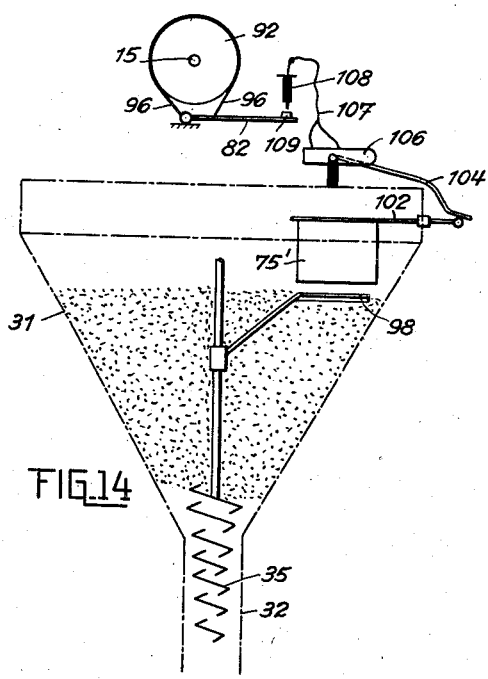
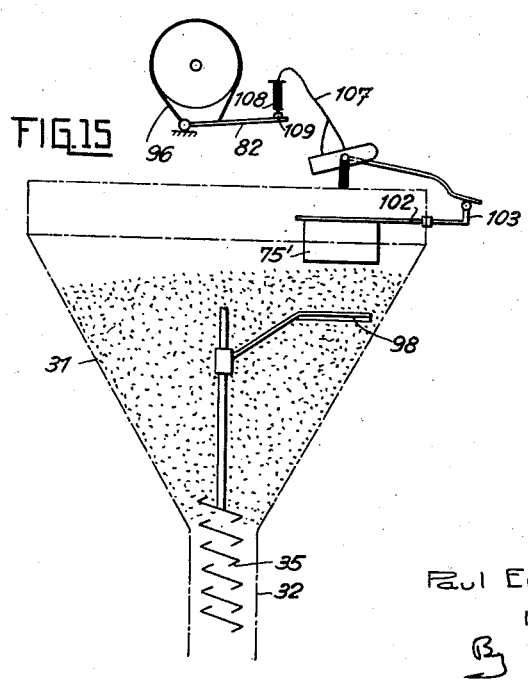
Paul Emil Fischer
INVENTOR
his ATTY.

Patented Sept. 17, 1935

2,014,617

UNITED STATES PATENT OFFICE 2,014,617

MEASURING AND FILLING DEVICE

Paul Emil Fischer, Weehawken, N. J., assignor to the firm Fr. Hesser, Maschinenfabrik-Aktiengesellschaft, Bad Cannstatt, Germany Application June 19, 1934, Serial No. 731,257
In Germany June 19, 1933

9 Claims. (Cl. 226—69)

My invention relates to devices intended for measuring and filling-in powdery materials or the like. The known devices of this kind have the drawback that the weights of the charges may differ very widely. It is an object of my invention to obviate this essential inconvenience. I have found that the said inconvenience is a consequence chiefly of the fact that powdery material to be filled in, for instance flour, is subject not only, while being manufactured, to changing influences of temperature and other conditions, but also, which being conveyed to the measuring and filling station, to great differences in the pressure undergone, so that the specific gravity of the flour is more or less modified by the air-percentage contained therein.

It has e. g. been found that when filling was started in the morning, the flour, having been subject to its own weight in the feeding bunker during the night, had been sensibly compressed and thus contained a relatively small amount of air. When this flour is fed to the filling devices adjusted for a definite filling height in the package, it should at first be ascertained whether the particular filling height adjusted is correct or must be changed, since flour sensibly compressed occupies a considerably less space in the package than flour more mixed with air. Furthermore, the degree of compression of the flour will change as the work proceeds since the flour now fed to the filling device will contain more air and have a larger volume for the same weight. This results in the necessity of continuously controlling and changing the filling height. In filling machines in which the packages are filled by an initial filling operation to a rough weight, and then by a subsequent filling or weighing operation to the definite weight, substantial differences of the quantities initially filled-in will result in the further drawback that the device intended for completing the quantity of flour to a definite weight cannot work accurately. When for instance the quantity initially filled into the package substantially differs from the normal difference, the completing weighing device is not afforded sufficient time for filling-in the necessary amount of flour so that the package insufficiently filled is too early advanced by the conveyor and brought to the closing station.

In order to obviate these and other inconveniences of the known devices, an important feature of the present invention is to compress the material to be measured, on its way from the feed of the material to the measuring device, to an essentially constant pressure and to feed the thus compressed material to the measuring station free from the influence of the atmospheric air. As now the material gets into the measuring device with a constant specific gravity, the measuring means, for instance a measuring worm or the like, will at a definite operation always feed a definite weight of material into the package or other container to be filled. In this way, the adjustment of the filling height in the package or the like is practically rendered superfluous and is practically replaced by a definite adjustment of the operation of the measuring means. A further advantage of the invention is that the subsequent mechanical closing operation of the filled packages is rendered more uniform and easy since the filling height is the same in all packages so that the formation of the closure is not adversely affected by varying heights in the contents of the packages.

My invention is illustrated, by way of example, in the accompanying drawings, in which, Figs. 1 and 2 show a complete measuring and filling device according to my invention, in side and front elevations, Fig. 2a is a detail side view of a closing arrangement for a filling tube, and Fig. 2b is a top plan view of the latter, Figs. 3 and 4 show as a detail, a braking mechanism forming part of and cooperating with the device, Fig. 5 shows the feeding and compressing mechanism forming a part of the device, on a larger scale, and Fig. 6 the same part in a section on line A—B of Fig. 5, Fig. 7 shows a part of the measuring mechanism, on a larger scale, Figs. 8 to 11 illustrate details of Fig. 7, Fig. 12 shows the measuring tube with a slight modification, and Figs. 13 to 15 show diagrammatically a modification of the measuring mechanism.

The material to be filled-in, e. g. flour, is conveyed through the feeding tube 1 into a stationary stirring receptacle 2, which is provided in a well-known way with stirring arms 4, 5 revolving on a vertical axle 3. Such stirring means and their operation are well known in the art and need no further description. The bottom 6 of the said receptacle 2 is provided at 7 with an outlet communicating with a connecting channel or tube 8. The latter leads to the inlet 9 of a cylindrical casing 10, one end of which is closed by a cover 11 and the other end of which leads into a chamber 12. In said casing or cylinder 10 there is disposed a rotatable conveyor worm 13 the thread of which ends a short distance from the point where the cylinder 10 terminates in the chamber 12. This worm is intended to compress, in its rotation, the flour against a suitable closing member subject to a definite, and, if desired, adjustable counter-pressure and determining or controlling the admission of the flour to the measuring device by uncovering the outlet of the cylinder 10 only if the pressure of the compressed material in said cylinder exceeds the counter-pressure acting on the said closing member 14. The latter consists, in the present embodiment, of a plate 14 covering or closing the orifice or outlet of the cylinder 10 into the chamber 12 and adapted to be yieldingly displaced horizontally in the direction of the movement of the material conveyed in the cylinder 10. To this end, the plate 14 is guided on the shaft 15 of the worm 13 by a circular recess and moreover connected to two guide rods 16, 17 which extend through a disc 18 closing the outer end of the chamber 12. The free ends of the said rods 16, 17 are connected by a bridge-piece 19 which is guided on a stud 20 by a central hole. The stud 20 is screwed in the said disc 18. A compression spring 21 wound around said stud can be adjusted as to its pressure by the nuts 22. The chamber 12 is provided at its top with an air suction pipe 25 connected with a suitable suction pump or another suitable device of well known construction for producing a vacuum or low pressure. The chamber 12 is hermetically closed against the atmosphere. The lower part of the chamber 12 is connected to a discharge tube or channel 30 which in turn communicates with a funnel 31 having a filling tube 32 connected thereto. The tube 30, the funnel 31 and the filling tube 32 are also closed hermetically, the outlet of the filling tube 32, in which the rotatable filling worm 35 is lodged, being hermetically closed by the flour column against the atmosphere. Preferably the diameter of the shaft of the above mentioned compressing worm 13 gradually increases from the inlet end of the cylinder 10 towards the pressure plate 14 which arrangement essentially contributes to the obtention of a uniform compression of the flour.

At the lower end or outlet of the filling tube 32 there is disposed a valve comprising a stationary part and a movable part both designed as a grate or lattice. The stationary part is screwed upon the filling tube, and according to Figs. 8 and 9 is consists of an outer threaded ring 40 and two inner rings 41, 42 interconnected by radial bars 43, 44, 45 and having a triangular section with its apex towards the interior of the said filling tube, so that segmental outlet openings outwards contracted are formed. On a central guide stud 50 of the stationary part is mounted the movable part of the valve, which according to Figs. 10 and 11 is constituted of an outer ring 51, an inner ring 52 and a boss 53. These parts are also interconnected by three radial bars 54, 55, 56. The movable part can be yieldingly moved towards the outlet openings of the stationary valve part. For this purpose, the movable part of the valve is according to Figs. 1, 2 and 7 connected by means of two strips 60, 61 with two carrying ledges 62, 63 pivoted at 66 to a yoke 60 by means of hinges 64, 65. The said yoke is pivotally mounted at 67 and provided with a rod 68 on which a counterweight 69 is adjustably mounted.

The lower part 51 may also be omitted so that the arrangement corresponds to Fig. 12.

In order to keep the height of the flour column in the funnel 31 as constant as possible, the latter is preferably provided with a suitable feeler 75 which is influenced by the flour in the funnel as soon as the flour rises beyond a definite level. The said feeler is pivoted to a rod 73 by means of a hinge 74, the flat end 72 of the said rod 73 being secured to the guide sleeve of the filling worm 35. In its deepest position, the feeler 75 can be held by any suitable stop. Against the top of the feeler 75 bears a displaceable pin 76 which extends through a guide sleeve 77 and a hole of the top wall 78 of the funnel to which said sleeve 77 is fastened. A double-armed and suitably pivoted lever 80 controlled by said pin 76 acts with its free end upon the free end of another double-armed and suitably pivoted lever 81 the other end of which can act upon a brake lever 82.

The conveyor worm 13 is driven by a sprocket wheel 86 keyed to the driving shaft 85 and connected by a chain with another sprocket wheel 87 which is free to revolve on a hub-like extension 90 of the cover 11, through the bore of which the shaft 15 of the worm 13 extends. With the sprocket wheel 87 is rigidly connected a wheel 91 internally toothed and which cooperates with two spur wheels 93, 94 mounted on a wheel 92 freely revoluble on the shaft 15, so that a so-called planetary gear is formed. The pinions 93, 94 mesh with a spur wheel 95 keyed to the shaft 15. The circumference of the wheel 92 is enclosed by a brake band 96, Fig. 3, the free ends of which are attached to the said brake lever 82. In the funnel 31, there are further disposed two suitable stirring blades 97, 98, which are constructed and operated in the well known manner and need, therefore, no further description.

In the electrically controlled embodiment, Figs. 13 to 15, the feeler is a plate 75' fastened to a shaft 102 which is so mounted pivotally in the top part of the funnel 31 that the free end thereof extends outwards. This free end carries a lever 103 supporting another lever 104 which is fastened to a shaft 105. The latter carries a mercury switch 106 of the well-known type and connected with an electromagnet 108 by wires 107. To the free end of the brake lever 82 is attached an armature 109.

The mode of operation is as follows: The flour fed through tube 1 to the receptacle 2 is subsequently fed by the stirring blades 4, 5 to the outlet 7 and drops into the channel 10 through the aperture 9. The worm 13 conveys the flour in the channel 10 towards the spring-acted plate 14 the resistance of the latter being initially higher than the pressure of the flour. This results in a compression of the flour, the air squeezed out escaping backwards between the threads of the worm 13 and through the cylinder 10 into the aperture 9 and then through the connection 8 into the receptacle 2. As soon as the compression of the flour has arrived at the desired degree, the pressure of the flour now sufficiently increased pushes back the plate 14 against the action of the spring 21, and so the flour finds an outlet into the chamber 12. From here, the compressed flour drops through channel 30 into the funnel 31. Here the flour is maintained in a uniformly mixed condition by the stirring blades 97, 98. The filling worm 35 conveys the flour from the funnel 31 through the filling tube 32 into the package which has been shoved over the latter by any suitable lifting device, the construction and operation of which are well known for this purpose. It is known, for instance, to use for this purpose a lifting support arranged beneath the filling tube and operated to shove the package over the filling tube 32 and to lower simultaneously with the measuring and filling process effected by the rotation of the filling worm 35 until the support on its downward movement meets and operates a suitable stop which by means of a suitable intermediate gearing stops the drive of the shaft 112 and, therefore, of the filling worm 35, so that filling process is finished. When passing through the bottom outlet of the said tube 32 the flour encounters a definite resistance by the valve which resistance can be modified, in the embodiment of Figs. 1, 2 and 7, more or less by a displacement of the counterweight 69 on the rod 68. As the pressure of the air is always constant in the closed casing separated and protected from the atmosphere, the flour and air ratio can no more change as soon as the flour has entered the chamber 12 and the funnel 31 so that the flour is caused to enter the package in the predeterminated uniform condition. By the measuring or conveying worm 13 being caused to convey a larger quantity of flour than the filling worm 35 as a rule removes, the static pressure of the flour would be increased within a definite time in the closed casing by the raising flour column in the funnel 31. In order to maintain a constant pressure of the flour, the feeler 75 is lifted as soon as the flour has arrived at a definite level, and this since the amount of flour between the top of the stirring blade 98 and the underside of the feeler 75 has meanwhile increased. In the embodiment according to Figs. 1 to 4, the pin 76 is then lifted by the feeler 75 and caused to release the brake band 96 by means of the two double-armed levers 80 and 81 and brake lever 82. By the brake band being so released, the wheel 92 of the said planetary gear is released so that it is allowed to freely revolve on the shaft 15. Therefore, the pinions 93, 94 of the gear simply roll idly on the inner toothed periphery of the driving wheel 91, so that the conveyor worm 13 comes to rest. The quantity of flour having again been diminished in the funnel 31, the feeler 75 descends, and the brake lever 82 is caused to tighten the brake band 96 and to brake or stop the wheel 92 which results in the rotation of the worm 13 being started again.

In the embodiment shown by Figs. 13 to 15, the feeler plate 75' is raised from its lowermost position, as soon as the level of the flour in the funnel 31 exceeds the limit shown in Figs. 13 and 14, so that the lever 103 is lifted as shown in Fig. 15. This movement angularly displaces the lever 104 and with the same the mercury switch 106 which closes the circuit 107. The magnet 108 thus energized attracts the armature 109 and moves the brake lever 82 in the direction of a release of the brake band 96. Also in this instance, the aforesaid wheel 92 of the planetary gear is allowed to freely revolve, and consequently the conveyor worm 13 is stopped.

The arrangement could also be made in such a way that a balance is mounted within the casing subject to a constant air pressure, said balance being charged in the known manner by feeding tubes which may be closed and into which the compressed material is filled. The load scale of the balance can now discharge the measured quantity of flour into the filling tube 32 from which the flour is conveyed by the filling worm 35 into the package or the like.

The described device is operated by the shaft 112 mounted in the bearing 113 and rotated by means of the pulley 114. On the innermost end of the shaft 112 there is keyed a conical toothed wheel 120 which is in mesh with a conical toothed wheel 121 keyed on the vertical shaft 118 mounted in suitable bearings of the frame and carrying at its lower end the measuring worm 35 fixed with the upper end of its shaft in a bore of the under end of the shaft 118. In this way, rotation is imparted to the measuring worm 35 from the said shaft 112. For measuring the desired quantities of the material, the shaft 112 is intermittently rotated so as to rotate the worm 35 each time to convey the quantity of material desired to be filled into each package or the like. This drive and operation are well known in the art and need, therefore, no further description or illustration. To the said shaft 112, there is also keyed a sprocket wheel 130 driving by means of a chain 131 a sprocket wheel 132 which is fixed on a shaft 133 suitably mounted in bearings 140 and 140' of the framing. To the other end of the shaft 133, there is keyed a sprocket wheel 134 which drives by means of the chain 135 a sprocket wheel 136 fixed to the above mentioned shaft 85. On the innermost end of the shaft 85, there is keyed a conical toothed wheel 119 which is in mesh with a conical toothed wheel 117 which in its turn is secured to a sleeve 129 mounted for rotation on the aforesaid vertical shaft 118. To the lowermost end of the said sleeve 129, there is fixed a ring 136 carrying the above mentioned stirring blades 97 and 98. The aforesaid conical toothed wheel 119 is also in mesh with a conical toothed wheel 116 which is fixed to the lowermost end of the above mentioned vertical shaft 3 bearing the stirring arms 4 and 5 in the receptacle 2. In this way, rotation is imparted from the shaft 85 to the stirring blades 97, 98 as well as to the stirring arms 4, 5.

It is obvious that various changes may be made in the device shown and described as an embodiment of the present invention, without departing from the spirit of the invention and the scope of the claims. The following claims, therefore, define the invention and its equivalents only as much as determined by the state of the art.

What I claim is:—

1. In a dosing and filling device of the type specified, dosing means for the material to be filled, means adapted to feed the material to said dosing means, means counteracting with a substantially constant pressure the feed of the material by said feeding means so as to effect the compression of the material to said constant pressure on its way from the feeding means to the dosing means, and a casing encircling the compressed material and the dosing means and hermetically closed towards the atmosphere, substantially as hereinbefore described.

2. In a dosing and filling device of the type specified, dosing means for the material to be filled, means adapted to feed the material to said dosing means, a movable member adapted to close the way from said feeding means to said dosing means, yielding means acting with a definite pressure upon said closing member to hold it in its closed position, and a casing encircling a chamber behind said closing member and the dosing means and hermetically closed towards the atmosphere, substantially as hereinbefore described.

3. In a dosing and filling device of the type specified, dosing means for the material to be filled, a conveyor worm to feed the material to said dosing means, means to rotate the conveyor worm, a valve having a chamber on one side thereof and counteracting with a substantially constant pressure the feed of the material by the said conveyor worm to effect the compression of the material to said constant pressure, a filling funnel for the dosing means, and a duct hermetically closed to atmosphere and disposed between the valve chamber and the funnel to protect the compressed material.

4. A dosing and filling device, as claimed in claim 3, in which the conveyor worm comprises a shaft increasing in diameter towards the said valve.

5. In a dosing and filling device as specified in claim 3, means adapted to couple and uncouple the drive of the conveyor worm, and controlling means arranged within the funnel of the dosing means actuated by the material in the funnel at a definite height of said material, said controlling means being adapted to operate said coupling and uncoupling means, substantially as hereinbefore described.

6. A dosing and filling device as specified in claim 3, having a planetary gear for driving the conveyor worm, a brake adapted to stop the part bearing the planetary wheels of this gear, and a feeler arranged within the funnel of the dosing means actuated by the material in the funnel at a definite height of the material, said feeler being adapted to operate the said brake.

7. In a dosing and filling device of the type specified, dosing means for the material to be filled, means adapted to feed the material to said dosing means, means counteracting with a substantially constant pressure the feed of the material by said feeding means so as to effect the compression of the material to said constant pressure on its way from the feeding means to the dosing means, and a casing encircling the compressed material and the dosing means and hermetically closed towards the atmosphere, said dosing means comprising a filling tube provided at its outlet with a recessed grate-like closure fixed to said outlet.

8. In a dosing and filling device of the type specified, dosing means for the material to be filled, means adapted to feed the material to said dosing means, means counteracting with a substantially constant pressure the feed of the material by said feeding means so as to effect the compression of the material to said constant pressure on its way from the feeding means to the dosing means, and a casing encircling the compressed material and the dosing means and hermetically closed towards the atmosphere, said dosing means comprising a filling tube provided at its outlet with a recessed grate-like closure fixed to said outlet and below said closure with a movable recessed grate-like valve covering the recesses of the fixed closure and adapted to be removed from this closure, and means adapted to hold the movable valve against the fixed closure with a definite pressure.

9. A dosing and filling device as claimed in claim 3, including means to maintain in said chamber on one side of the valve a pressure below the atmospheric pressure.

PAUL EMIL FISCHER.